Sept. 29, 1970     H. FLEISHER ET AL     3,531,180
DISPERSION COMPENSATED DISPLAY SYSTEM
Filed Oct. 26, 1967                                            2 Sheets-Sheet 1
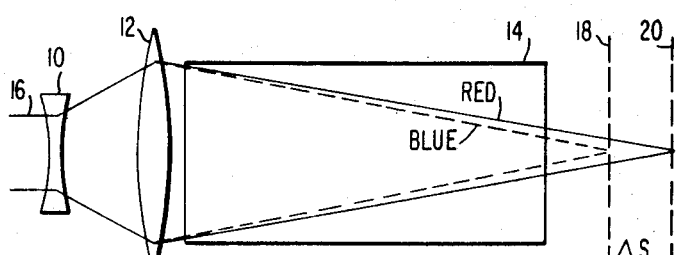
PRIOR ART
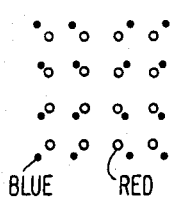
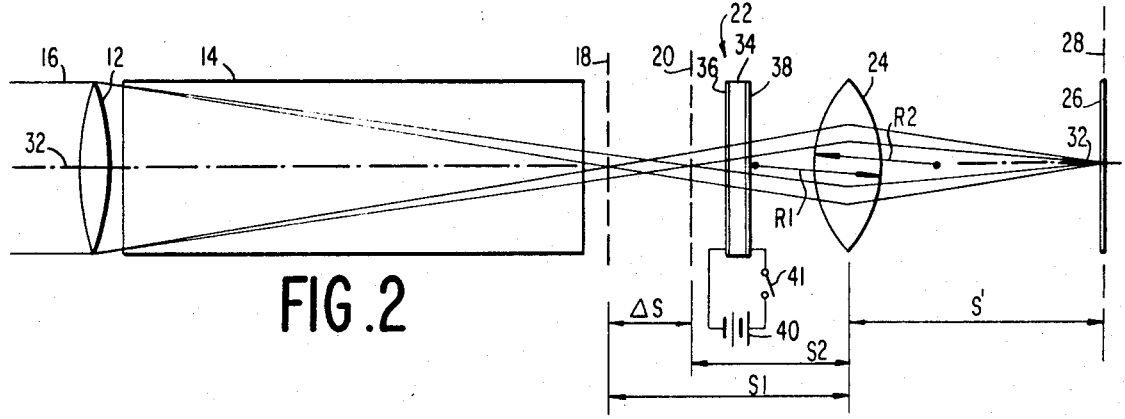
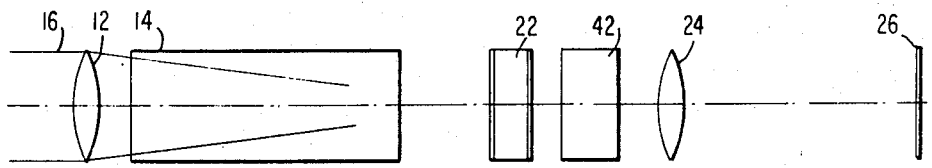
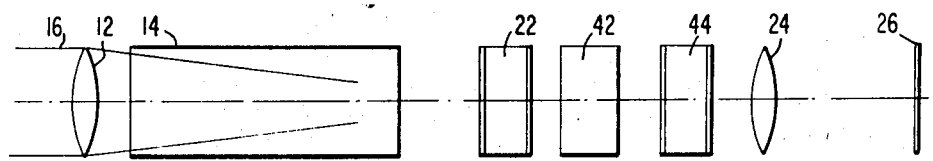
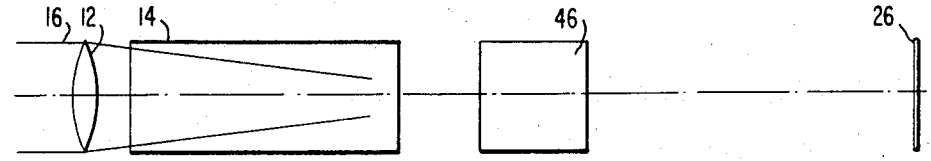
INVENTORS
HAROLD FLEISHER
THOMAS J. HARRIS
ERHARD MAX
BY *Hughes, Rothwell, Mion, Zinn & Macpeak*
ATTORNEYS ns patent Office
3,531,180
Patented Sept. 29, 1970

3,531,180
DISPERSION COMPENSATED DISPLAY SYSTEM
Harold Fleisher and Thomas J. Harris, Poughkeepsie, N.Y., and Erhard Max, Baden, Wurttemberg, Germany, assignors to International Business Machines Corporation, Armonk, N.Y., a corporation of New York
Filed Oct. 26, 1967, Ser. No. 678,444
Int. Cl. G02f 1/26, 1/40
U.S. Cl. 350—150                                7 Claims

ABSTRACT OF THE DISCLOSURE

An optical display system which is compensated for focal plane dispersion and position dispersion so that spot images of two different colors or wavelengths of laser light have the same size and position on a display screen located in an image plane at the output of the system. Compensation is provided by the combination of an electro-optic polarization rotator and a birefringent lens whose optic axis is oriented so that the lens has two focal points corresponding to its ordinary and extraordinary indices of refraction. The electro-optic rotator operates on the polarization directions of the two wavelengths so that one wavelength follows the path of the ordinary ray through the berefringent lens and the other wavelength follows the path of the extraordinary ray. The lens material and the radii of curvature of the lens surfaces are chosen such that both the focal plane dispersion and the position dispersion of the deflector are effectively cancelled. Consequently, spot images of both colors have the same size and are in focus in the same image plane or screen position. In a modification, a birefringent plate may be introduced to relax the requirements on the lens for compensating for the focal plane dispersion and for providing dispersion compensation for three different colors. Alternatively, the dispersion compensation may be provided by a Fresnel zone plate which has anomalous dispersion.

CROSS REFERENCES TO RELATED APPLICATIONS

Pending application Ser. No. 399,285 filed Sept. 25, 1964, now Pat. No. 3,391,972 issued July 9, 1968 and assigned to the assignee of this application discloses the path-length compensated digital light deflector used in the dispersion compensated optical display system of this application.

BACKGROUND OF THE INVENTION

Field of the invention

This invention pertains to the art of image display systems including a relatively long birefringent digital light deflector and means for compensating for focal plane dispersion and position dispersions which occurs when two different colors of light are used. The dispersion is caused by the increase of the ordinary and extraordinary indices of refraction of the digital light deflector for shorter wavelengths. For image display purposes, images must have the same size and be imaged or focused on the same display screen regardless of the color of the image. The focal plane dispersion cannot be compensated for at the input of the deflector by a combination of glass lenses since the anomalous difference in indices of refraction must be in the order of $\Delta n \approx 0.02$, and no combination of regular glass lenses could account for such a large value. Prior art attempts of adding anomalous dispersive crystals to the Calcite deflector have been unsuccessful because of the difficulty of obtaining such crystals. Furthermore, such ultimately reduces the optical resolution.

SUMMARY

The present invention solves the problem of focal plane dispersion and position and position dispersion caused by a light deflector in an image display system by providing an external anomalous dispersion means which compensates for the normal dispersion of the linearly polarized light passing through a deflector. In the preferred embodiment, the anomalous dispersion means comprises an electro-optic rotator and a birefringant lens. The rotator rotates the polarization direction of one color of light such that it follows the path of the ordinary ray through the birefrigent lens and the other color such that it follows the path of the extraordinary ray. The birefringent lens has two focal lengths: one for the extraordinary ray and one for the ordinary ray. If the shorter wavelength image is made to follow the path with the longer focal length, and the birefrigent material is chosen to have the proper index of refraction, the focal plane dispersion introduced by the deflector is eliminated. The shorter wavelength image from the deflector is larger but is farther away from the birefringent lens than the longer wavelength image. The radius of curvature of the lens surfaces can be designed to give the correct magnifications to eliminate position dispersion so that both images are also the same size in the image plane of the lens.

BRIEF DESCRIPTION OF THE DRAWING

FIG. 1a is a schematic diagram which illustrates the focal palne dispersion of a prior art uncompensated display system having a digital light deflector;

FIG. 1b illustrates the front view of the deflector output and shows position dispersion of an image transmitted through the deflector of FIG. 1a;

FIG. 1c illustrates the side view of the deflector output and shows both the focal plane and position dispersion of the deflector of FIG. 1a;

FIG. 2 is a schematic diagram of a preferred embodiment of the dispersion-compensated display system of this invention;

FIG. 4 is a schematic diagram of a modification of FIG. 2;

FIG. 5 is a schematic diagram of a modification of FIG. 4;

FIG. 6 is a schematic diagram of another embodiment of the invention utilizing a Fresnel zone plate.

DESCRIPTION OF THE PREFERRED EMBODIMENT

Figure 3:
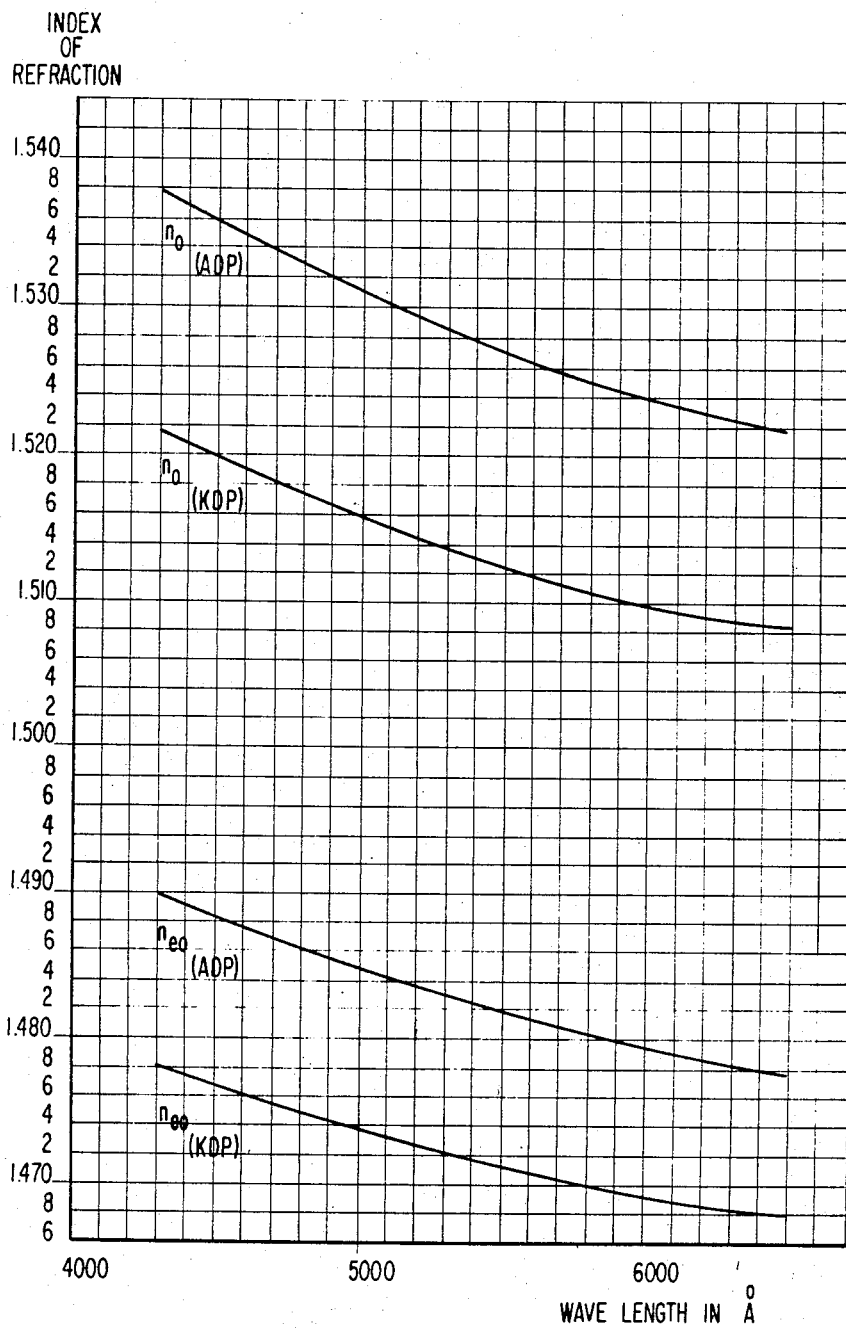
FIG. 3 is a graph showing the ordinary and extraordinary indices of refraction of ADP and KDP as a function of light wavelength.

FIG. 1 is a schematic diagram illustrating the focal plane and position dispersion which occurs in a prior art image display system which is not compensated for the dispersion of the light deflector. Focal plane dispersion is also known as axial or longitudinal chromatic aberration, and position dispersion is also known as lateral chromatic aberration. Such a system includes a dispersion-compensated negative lens 10, dispersion-compensated positive lens 12 and a path length compensated digital light deflector 14. Deflector 14 is disclosed in the above-cited application, and the compensated lenses 10 and 12 may actually consist of several lens elements.

The deflector 14 comprises a plurality of stages each of which consists of an electro-optic polarization rotator and a birefringent crystal, such as Calcite. The light beam 16 incident upon lens 10 for this application is linearly polarized. The voltage applied to the rotator of each stage rotates the polarization to one of two directions so that the light beam will follow one of two possible paths through the birefringent crystals of that stage. All of the stages are controlled in a similar manner such that the input light beam 16 may be positioned in both X and Y directions at the output of the deflector under the control of the voltages applied to the rotators.

Since deflector 14 is path length compensated, if only one color or wavelength of light is used, all light beams will have a common focal plane regardless of the amount of deflection caused by deflector 14. However, since the index of refraction of a transparent material varies with the wavelength of the light, focal plane dispersion and position dispersion will occur if the display system is used with two or more different colors of light, such as blue and red.

This dispersion must be eliminated when using focused light since the combination of lens 12 and deflector 14 will have different focal lengths for different colors. As shown in FIG. 1a, since the index of refraction is greater for shorter wavelengths, the focal length for blue light is shorter than the focal length for red light, and the blue spot image is formed in an image plane 18 and the red spot image in an image plane 20. The distance between the two focal planes is designated $\Delta S$. Furthermore, because of the different image planes, the blue and red images will not be coincident on a fixed display screen. The combined lateral positioning of lens 12 and deflector 14 will cause the blue image to be larger than the red, because the deflection of the birefringent crystals in each stage is wavelength dependent.

FIG. 1b shows the resultant position dispersion for an image consisting of an array of points as seen looking toward the right end of deflector 14. FIG. 1c illustrates both the focal plane dispersion and position dispersion as seen from the right side of FIG. 1a. The solid dots represent the blue image and the circles represent the red image.

The dispersion cannot be directly compensated by adding anomalous dispersive crystals to the Calcite of deflector 14, since such crystals are difficult to obtain. Furthermore, such an approach increases the length of deflector 14 and ultimately reduces the optical resolution. A transparent medium has anomalous dispersion when it has a higher index of refraction for longer wavelengths than for shorter wavelengths.

Furthermore, the lens device 12 cannot provide the necessary compensation since the anomalous difference in refractive indices of such an anomalous dispersive lens would have to be on the order of $\Delta n = 0.02$ at the input of the path length-compensated light deflector 14. As a practical matter, no combination of regular glass lenses could account for such a great value. The requirements for a glass lens at the output of deflector 14 are even more strained since such a lens would have to compensate for the same order of magnitude of normal dispersion as at the input side and, in addition, compensate for the resultant position dispersion.

FIG. 2 is a schematic diagram of a preferred embodiment of this invention in which an external means effectively compensates for the focal plane and position dispersion introduced by a path length compensated digital light deflector in the image display system of FIG. 1. In FIG. 2, the collimated, linearly polarized laser beam 16 is passed through lens 12 and path length-compensated digital light deflector 14. The output of the deflector 14 is then passed through an electro-optic switch 22 and a birefringent lens 24 to form an image on a screen 26 in an image plane 28. A birefringent lens has two focal lengths $f_{no}$ and $f_{neo}$ corresponding to the ordinary ray index of refraction $n_o$ and the extraordinary ray index of refraction $n_{eo}$, respectively, of the material of lens 24. The birefringent crystal of lens 24 is oriented so that its optic axis is either perpendicular to the plane of the paper or else in the plane of the paper and perpendicular to the system axis 32. The focal length $f_{no}$ of the ordinary ray is shorter than the focal length $f_{neo}$ of the extraordinary ray. Consequently, if the linear polarization direction of the red light image is rotated so that it follows the optical path of the ordinary ray through birefringent lens 24 and the polarization direction of the blue light image is rotated so that it follows the optical path of the extraordinary ray through lens 24, then the blue and red spot images will have a common image plane 28 at an image distance $S'$ from lens 24. Screen 26 is placed in the image plane 28.

However, the blue image from deflector 14 is larger than the red image, so that lens 24 must compensate for the remaining position dispersion. The curvature of lens 24 must be chosen such that the red and blue images are the same size on the screen 26. The images from deflector 14 act as objects for lens 24. The object plane 20 of the smaller red image is closer to lens 24 than the object plane 18 of the larger blue image. The curvature of the lens is designated so that the lateral magnification of the lens produces superimposed blue and red images of the same size on screen 26.

Electro-optic switch 22 is an electro-optic polarization rotator which rotates the direction of linear polarization through an angle dependent upon the applied voltage and is well known in the art. It may consist of an electro-optic crystal 34, such as KDP, two transparent electrodes 36 and 38, a variable voltage source 40, and a switch 41.

Let us now calculate the distances $S_1$, $S_2$, $S'$, $r_1$ and $r_2$. The collimated laser beam 16 is focused by lens 12 through the compensated digital light deflector 14. If the beam is blue, it will be focused onto plane 18. If the beam is red, then it will be focused in plane 20. The lens 24 is constructed with a birefringent material such as KDP, ADP, quartz, Calcite, etc., and has two focal lengths. For one polarization the focal length is $f_1$, and the lens 24 will image plane 18 onto plane 28, and for the other polarization, the focal length will be $f_2$ and the lens 24 will image plane 20 onto plane 28.

The distances $S'$, $S_1$ and $S_2$ must be selected so that lens 24 images object planes 18 and 20 onto plane 28 and causes object planes 18 and 20 to be the same size and registered.

Six basic equations must be satisfied so that object planes 18 and 20 are focused onto the same plane 28 and are the same size:

Magnification:

$$M_1 = -\frac{S'}{S_1} \quad (1)$$

$$M_2 = -\frac{S'}{S_2} \quad (2)$$

Focal length:

$$\frac{1}{f_1} = (n_{eo_1} - 1)\left(\frac{1}{r_1} - \frac{1}{r_2}\right) \quad (3)$$

$$\frac{1}{f_2} = (n_{o_2} - 1)\left(\frac{1}{r_1} - \frac{1}{r_2}\right) \quad (4)$$

where:

$r_1$ and $r_2$ are the radii of curvature of the surfaces of lens 24

$n_{eo_1}$ is the extraordinary index of refraction of the lens for a wavelength $\lambda_1$ $n_{o_2}$ is the ordinary index of refraction for a wavelength $\lambda_2$ Lens formula:

$$\frac{1}{S'} + \frac{1}{S_1} = \frac{1}{f_1} \quad (5)$$

$$\frac{1}{S'} + \frac{1}{S_2} = \frac{1}{f_2} \quad (6)$$

From the requirement that the sizes of two objects, $O_1$ in plane 18 and $O_2$ in plane 20 must be the same size in plane 28 we have $$M_1 O_1 = M_2 O_2$$

or $$\frac{M_1}{M_2} = \frac{O_2}{O_1}$$

Using Equations 1 and 2

$$\frac{M_1}{M_2} = \frac{S'}{S_1}\frac{S_2}{S'} = \frac{S_2}{S_1} = \frac{O_2}{O_1}$$

or $$S_2 = S_1 \frac{O_2}{O_1}$$

From FIG. 1

$$S_1 - S_2 = \Delta S \quad (7)$$

Therefore $$S_1 - \Delta S = S_1 \frac{O_2}{O_1}$$

$$S_1 \left(1 - \frac{O_2}{O_1}\right) = \Delta S$$

$$S_1 = \frac{\Delta S}{1 - \frac{O_2}{O_1}} \quad (8)$$

For a given deflector 14 and set of wavelengths $\lambda_1$ and $\lambda_2$, we will know $\Delta S$, $O_1$ and $O_2$ and the object distance $S_1$ is determined by Equation 8.

Using Equations 3 and 4

$$\frac{f_1}{f_2} = \frac{(n_{o2}-1)}{(n_{eo_1}-1)} \quad (9)$$

Using Equations 5 and 6

$$\frac{f_1}{f_2} = \frac{S_1}{S_1+S'} \cdot \frac{S_2+S'}{S_2} \quad (10)$$

and $$\left(1 - \frac{f_1}{f_2}\right)S_1 S_2 + S'\left(S_1 - \frac{f_1}{f_2}S_2\right) = 0 \quad (11)$$

Equations 8, 9, 10 and 11 can now be used to specify the lens characteristics and the object and image distances $S_1$ and $S'$ respectively ($S_2$ is given by Equation 7).

First determine $S_1$ given $\Delta S$ and sizes $O_1$ and $O_2$. Assume a value of $S' = S_1$ and substitute the values of $S_1$, $S_2$ and $S'$ into Equation 10 to obtain an approximate value of $f_1/f_2$. Using Equation 9 select a material which is close to the desired value and calculate the value $f_1/f_2$ for the material chosen. Substitute $S_1$, $S_2$ and $f_1/f_2$ into Equation 11 to obtain the image distance $S'$. Equation 5 can now be used to calculate the value $f_1$. The value $f_1$ is substituted into Equation 3 and the radius of curvature $r_1 = -r_2$ of the lens is calculated.

The procedure outlined above fully specifies all the parameters of the system so that the objects $O_1$ and $O_2$ are properly imaged onto plane 28.

As an example, consider a two dimensional compensated digital light deflector 14 which is $20\sqrt{2}$ inches long. The distance $\Delta S$ is approximately $$\Delta S = 20\sqrt{2}\left(\frac{n_{o_1}-n_{o_2}}{2} + \frac{n_{eo_1}-n_{eo_2}}{2}\right)$$

From Table I using $\lambda_1 = 4545$ A. (blue) and $\lambda_2 = 6430$ A. (red) we have $$\Delta S = 20\sqrt{2}\left(\frac{1.6725-1.6550}{2} + \frac{1.4926-1.4839}{2}\right)$$

$$\Delta S = 20\sqrt{2}\left(\frac{0.0175}{2} + \frac{0.0077}{2}\right)$$

$$\Delta S = 20\sqrt{2}\,(0.0126)$$

$$\Delta S = .356 \text{ inches}$$

The difference $\Delta O$ in sizes of the object planes $O_1$ and $O_2$ can be determined by using the 29 minutes of dispersion or difference in splitting angle $E_{max}$ for the two wavelengths given in Table I below.

$$\Delta O = 10\sqrt{2}\left(\frac{29}{60}\right)\left(\frac{1}{57.3}\right) = .119 \text{ inches}$$

where we have converted 29 minutes into radians and used only half the deflector length $10\sqrt{2}$ for one dimension of lateral dispersion.

TABLE I.—DISPERSION CHARACTERISTICS OF DEFLECTOR 14

| $\lambda$, A. | $n_o$ | $n_{eo}$ | $E_{max}$ | $n_o - n_{eo}$ Difference |
|---|---|---|---|---|
| 4,545 | 1.6725 | 1.4926 | 6°30′ | .1795 |
| 4,579 | 1.6715 | 1.4924 | | .1791 |
| 4,658 | 1.6705 | 1.4919 | | .1785 |
| 4,727 | 1.6695 | 1.4915 | | .1780 |
| 4,764 | 1.6690 | 1.4912 | | .1778 |
| 4,880 | 1.6675 | 1.4905 | | .1771 |
| 4,965 | 1.6666 | 1.4901 | | .1765 |
| 5,017 | 1.6660 | 1.4898 | | .1762 |
| 5,145 | 1.6646 | 1.4892 | 6°28′ | .1754 |
| 5,589 | 1.6583 | 1.4864 | 6°12′ | .1720 |
| 6,430 | 1.6550 | 1.4849 | 6°1′ | .1700 |

$$O_1 = O_2 + \Delta O$$
$$O_2 = O_1 - \Delta O$$
$$\frac{O_2}{O_1} = 1 - \frac{\Delta O}{O_1}$$

If the size of object plane $O_1$ is 1″ x 1″ then $$\frac{O_2}{O_1} = 1 - O\Delta$$

From Equation 8

$$S_1 = \frac{\Delta S}{1 - \frac{O_2}{O_1}} = \frac{.356}{.119}$$

$S_1 \approx 3$ inches, and
$S_2 \approx 2.6$ inches

From Equations 10 and 7

$$f_1/f_2 = \frac{S_1}{S_1+S'} \cdot \frac{S_2+S'}{S_2}$$

$$f_1/f_2 = \frac{3}{3+S'} \cdot \frac{2.6+S'}{2.6}$$

$$= 1.15 \frac{2.6+S'}{3+S'}$$

Assume $S' \approx S_1$ in order to choose a lens material having an index of refraction in the desired range.

$$f_1/f = 1.15 \frac{5.6}{6} = 1.07$$

Select ADP as the birefringent material for lens 24. From the curves in FIG. 3

$$\lambda_1 \approx 4545 \text{ A.} \quad n_{eo_1} = 1.488$$
$$\lambda \approx 6430 \text{ A.} \quad n_{eo_2} = 1.522$$

Using Equation 9

$$f_1/f_2 = \frac{n_{o_2}-1}{n_{eo_1}-1} = \frac{0.522}{0.488} = 1.07 \quad (12)$$

Using Equation 11

$$(1-f1/f2)S_1 S_2 + S'(S_1 - f1/f2 S_2) = 0$$
$$-(.07)(3)(2.6) + S'(3 - (1.07)(2.6)) = 0$$
$$-.54 + S'(3-8) = 0$$

$$S' = \frac{.54}{.2} = 2.7 \text{ inches}$$

Using Equation 5

$$1/f_1 = 1/S_1 + 1/S'$$
$$= .33 + .37$$
$$= .70$$
$$f_1 = 1.4 \text{ inches}$$

From Equation 12

$$f_2 = f_1/1.07 = \frac{1.4}{1.07} = 1.3 \text{ inches}$$

As a check calculate $f_2$ using Equation 6

$$1/f_2 = 1/S' + 1/S_2$$

when $$S_2 = S_1 - \Delta S = 3 - .356 = 2.6$$
$$1/f_2 = .37 + .39$$
$$= .76$$
$$f_2 = 1.3 \text{ inches}$$

which agrees with the 1.3 inch value calculated using Equation 12.

Using Equation 3

$$1/f_1 = (n_{eo_1} - 1)\left(\frac{1}{r_1} - \frac{1}{r_2}\right)$$

for $$r_1 = r_2 \text{ and } n_{eo_1} = 1.488$$

$$.652 = (.488)\frac{2}{r_1}$$

$$r_1 = \frac{(.488)(2)}{(.652)} = 1.50 \text{ inches}$$

As a check use Equation 4

$$1/f_2 = (n_{o_2} - 1)\left(\frac{1}{r_2} - \frac{1}{r_3}\right)$$

$$.697 = (.522)2/r_1$$

$$r_1 = \frac{(.522)2}{(.697)}$$

$$r_1 = 1.50 \text{ inches}$$

Thus, give $\Delta S = .356$ inch and $O_2/O_1 = 1 - \Delta O = .881$ for this example, and using an ADP birefringent lens we have the following parameters which will allow simultaneous correction of the focal plane dispersion $\Delta S$ and position dispersion $O_2/O_1$:

$$S_1 = 3 \text{ inches}$$
$$S_2 = 2.6 \text{ inches}$$
$$S' = 2.7 \text{ inches}$$
$$r_1 = r_2 = 1.50$$

Blue light is polarized so that the index of refraction of lens 24 is $n_{eo_1} = 1.488$, and the red light is polarized so that the lens 24 presents an index of refraction $$n_{o_2} = 1.522$$

FIG. 4 is similar to FIG. 2 but includes a passive birefringent plate 42 located between the electro-optic switch 22 and the birefringent lens 24. The inclusion of the birefringent plate 42 relaxes the material and design requirements on the birefringent lens 24 because plate 42 can cause the focal plane dispersion $\Delta S$ of deflector 14 to increase or decrease by proper orientation of the axes of the plate. The addition of birefringent plate 42 is required when the $\Delta S$ and $O_2/O_1$ values of a deflector system cannot be satisfied with a given birefringent lens 24. Furthermore, the combination of the birefringent lens 24 and a birefringent plate 42 can be adjusted more easily for compensating the focal length dispersion and the position dispersion. For example, the birefringent lens may be designed to compensate exactly for the position dispersion of two image fields from deflector 14 when the planes 18 and 20 are separated by a distance $d$. However, the actual focal plane dispersion $\Delta S$ of the image planes may be greater than distance $d$. The difference $\Delta S - d$ can be compensated for by the birefringent plate 42 since the relative shift of the blue and red focal planes depends on only the thickness of the plate 42. In the extreme case, plate 42 can be made thick enough to compensate entirely for the focal plane dispersion and then lens 24 may be a glass lens designed to compensate only for position dispersion.

FIG. 5 shows a modification of FIG. 4 wherein a second electro-optic switch 44 is added. In this case if the first switch 22 is not energized, both polarizations enter the birefringent plate 42 polarized along the same axis; hence, there is no change in $\Delta S$. The second electro-optic switch 44 and birefringent lens 24 then operate as previously described so that two colors can be corrected. If a third color is introduced into the system and the length of the birefringent plate 42 is properly selected, then the first electro-optic switch 22 can be energized to shift the position of the third color so that the birefringent lens 24 will image the output plane of the third color onto the same image plane 26 as the first two colors. This system can be used to correct for three colors, one at a time.

FIG. 6 shows the same image display system in which the compensation is provided by a Fresnel zone plate 46 which has an actual anomalous dispersion. The Fresnel zone plate can be designed such that the normal dispersion within the image display system is effectively cancelled out by the anomalous dispersion of the Fresnel zone plate so that the blue and red images are the same size and superimposed upon each other on screen 26. Two different wavelengths may be simultaneously compensated by the embodiment of FIG. 6.

The focal length of a Fresnel zone plate is given by $$f = \frac{R^2}{\lambda}$$

when R is the radius of the first zone.

For two wavelengths $\lambda_1$ and $\lambda_2$ $$f_1 = \frac{R^2}{\lambda_1}$$

$$f_2 = \frac{R^2}{\lambda_2}$$

and $$\frac{f_1}{f_2} = \frac{\lambda_2}{\lambda_1}$$

Assume the same wavelengths as in the previous example, $$\lambda_1 = 4545 \text{ Å.}$$
$$\lambda_2 = 6430 \text{ Å.}$$

therefore $$\frac{f_1}{f_2} = \frac{6430}{4545} = 1.445$$

This value of $f_1/f_2$ is too large to correct the $\Delta S$ and $O_2/O_1$ values in the previous example, but it could be used in other deflector systems. The same Formulas 1 through 12 can be used to determine $S'$, $S_1$ and $S_2$.

Any one of the foregoing embodiments of the invention provides an optical display system which is dispersion compensated. Two different colors of light can be used in the system, and both color images will be the same size and have the same focal plane. A third color can be introduced by the technique shown in FIG. 5.

While the invention has been particularly shown and described with reference to preferred embodiments thereof, it will be understood by those skilled in the art that various changes in form and details may be made therein without departing from the spirit and scope of the invention.

What is claimed is:
1. In an optical display system in which a linearly polarized multicolor light beam is focued through a light deflecting refraction means which ordinarily causes the images for the different colors to be of different sizes and focused in different image planes separated by a distance $\Delta S$, dispersion compensation means comprising:
 (a) rotating means in the path of the light passed by said refraction means for rotating the direction of polarization of a light beam to one of two directions depending upon the color of the light beam,
 (b) birefringent means including a lense in the path of the rotated beam and oriented to direct light polarized in one of said directions along the path of the ordinary ray toward a common image plane and light polarized in the other of said directions long the path of the extraordinary ray toward said common image plane, said lens being spaced a distance $S_1$ from a first image plane of a first color of light in an uncompensated system, a distance $S_2$ from a second image plane of a second color of light in an uncompensated system, and a distance $S'$ from said common image plane, said distance $S_1$ satisfying the relationship $$S_1 = \frac{\Delta S}{1 - \frac{O_1}{O_2}}$$

where $O_1$ is the image size in said first image plane and $O_2$ is the image size in said second image plane, and the ratio of the focal length $f_1$ of said lens for said extraordinary ray to the focal length $f_2$ of said lens for said ordinary ray satisfying the relationship $$\frac{f_1}{f_2} = \frac{S_1}{S_1 + S'} \cdot \frac{S_2 + S'}{S_2}$$

2. A dispersion compensated optical display system as defined in claim 1 wherein said lens is a birefringent lens, whereby focal plane dispersion and position dispersion caused by the normal dispersion of said light deflecting refraction means is cancelled.

3. A dispersion compensated optical display system as defined in claim 2 wherein said birefringent means further comprises a birefringent plate positioned before said lens.

4. A dispersion compensated optical display system as defined in claim 3 wherein said rotating means comprises a pair of electro-optic switches, one between said birefringent plate and said birefringent lens, and one between said birefringent plate and said deflecting means, whereby three colors of light may be compensated for by both said focal plane dispersion and said position dipersion.

5. A dispersion compensated optical display system as defined in claim 1 for focusing on said common image plane linearly polarized light beams of two different colors wherein said rotating means causes the shorter wavelength beam to follow the path of said extraordinary ray and the longer wavelength beam to follow the path of said ordinary ray.

6. A dispersion compensated optical display system as defined in claim 1 wherein said birefringent means comprises a birefringent plate having a thickness sufficient to compensate for focal plane dispersion and said lens is a glass lens which cancels the position dispersion of images of said different colors in said common image plane.

7. In an optical display system in which a linearly polarized multicolor light beam is focused through a light deflecting refraction means which ordinarily cause images for the different colors to be of different sizes and focused in different image planes separated by a distance $\Delta S$, dispersion compensation means comprising:

a Fresnel zone plate in the path of light passed by said refraction means and having an anomalous dispersion such that the ratio of the focal lengths for first and second colors is defined as $$\frac{f_1}{f_2} = \frac{\lambda_2}{\lambda_1}$$

where $f_1$ and $f_2$ are the focal lengths of the Fresnel zone plate for said first and second colors having wavelengths $\lambda_1$ and $\lambda_2$, respectively, said Fresnel zone plate being spaced a distance $S_1$ from a first image plane of said first color in an uncompensated system, a distance $S_2$ from a second image plane of said second color in an uncompensated system, and a distance $S'$ from a common image plane in which said images are focused by said Fresnel zone plate, said distance $S_1$ satisfying the relationship $$S_1 = \frac{\Delta S}{1 - \frac{O_2}{O_1}}$$

where $O_1$ is the image size in said first image plane and $O_2$ is the image size in said second image plane, and said ratio of the focal lengths satisfying the relationship $$\frac{f_1}{f_2} = \frac{S_1}{S_1 + S'} \cdot \frac{S_2 + S'}{S_2}$$

References Cited

UNITED STATES PATENTS

| | | | |
|---|---|---|---|
| 3,391,972 | 7/1968 | Harris et al. | 350—150 |
| 3,402,001 | 9/1968 | Fleisher | 350—150 |
| 3,410,624 | 11/1968 | Schmidt | 350—150 |

OTHER REFERENCES

Fleisher et al.: I.B.M. Tech. Disc. Bulletin, vol. 6, No. 3, August 1963, "Radiation Controlled Radiation Gate."

Kosanke, et al.: I.B.M. Tech. Disc. Bulletin, vol. 10, No. 1, June 1967, "Compensator For Light Deflector."

DAVID SCHONBERG, Primary Examiner

P. R. MILLER, Assistant Examiner

U.S. Cl. X.R.

350—147, 157, 175

UNITED STATES PATENT OFFICE
CERTIFICATE OF CORRECTION

Patent No. 3531180                             Dated September 29, 1970

Inventor(s) Harold Fleisher et al

It is certified that error appears in the above-identified patent and that said Letters Patent are hereby corrected as shown below:

Column 1, lines 71-72 — after "such" and before "ultimately" the following was omitted: "an approach increases the length of the light deflector and"

Column 2, line 3 — "and position" repeated line 7 — " a deflector" should be "the deflector"

line 59 — "a" omitted before "dispersion-compensated"

Column 5 line 10 — $S_1-S_2=S$ should be $S_1-S_2=\Delta S$ line 16 — $S_1(1=\frac{O_2}{O_1}$ should be $S_1(1-\frac{O_2}{O_1}$ line 53 — $20\sqrt{2}$ should be $20\sqrt{2}$ line 60 — 1.4839 should be 1.4849

Column 6 line 24 — $1 - O \Delta$ should be $1 - \Delta O$ line 43 — $S' \cong S_1$ should be $S' \cong S_1$ line 46 — $f_1/f$ should be $f_1/f_2$ line 51 — $\lambda 1 \cong$ should be $\lambda 1 =$ line 52 — $\lambda \cong$ should be $\lambda 2 =$

UNITED STATES PATENT OFFICE
CERTIFICATE OF CORRECTION

Patent No. 3531180  Dated September 29, 1970

Inventor(s) Harold Fleisher et al

It is certified that error appears in the above-identified patent and that said Letters Patent are hereby corrected as shown below:

line 52     - $n_{eo_2}$ should be $n_{o_2}$

Column 7, line 17     - $r_2$ should be $-r_2$ line 26     $\left(\frac{1}{r_2} - \frac{1}{r_3}\right)$ should be $\left(\frac{1}{r_1} - \frac{1}{r_2}\right)$ line 33     - "give" should be "given"

Column 9, line 13-14 - $1-\frac{O_1}{O_2}$ should be $1-\frac{O_2}{O_1}$

SIGNED AND SEALED
JAN 26 1971

(SEAL)
Attest:

Edward M. Fletcher, Jr.
Attesting Officer

WILLIAM E. SCHUYLER, JR.
Commissioner of Patents